United States Patent [19]

Fiscus

[11] 4,091,388
[45] May 23, 1978

[54] BORESIGHT ERROR COMPENSATION IN BORESIGHTING ANTENNA-RADOME SYSTEM

[75] Inventor: Thomas Edward Fiscus, San Diego, Calif.

[73] Assignee: General Dynamics Corporation Electronics Division, San Diego, Calif.

[21] Appl. No.: 748,662

[22] Filed: Dec. 8, 1976

[51] Int. Cl.$^2$ .................... H01Q 19/06; H01Q 1/42
[52] U.S. Cl. .................................. 343/872; 343/909
[58] Field of Search ............... 343/753, 754, 872, 909

[56] References Cited

U.S. PATENT DOCUMENTS

| 3,633,206 | 1/1972 | McMillan | 343/754 |
| 3,961,333 | 6/1976 | Purinton | 343/909 |

FOREIGN PATENT DOCUMENTS

| 689,408 | 3/1953 | United Kingdom | 343/754 |

OTHER PUBLICATIONS

Chao-Chun Chen, *Diffraction of Electromagnetic Waves by a Conducting Screen Perforated Periodically with Circular Holes*, IEEE MTT, May, 1971, pp. 475–481.

*Primary Examiner*—Alfred E. Smith
*Assistant Examiner*—Harry E. Barlow
*Attorney, Agent, or Firm*—Brown & Martin

[57] ABSTRACT

A boresighting antenna for receiving signals within a given frequency band is covered by a radome having a wall including dielectric material. Boresight error compensation is provided by one or more pairs of perforated metal plates. Each plate has a dielectric material thereon. The plates of each pair are positioned symmetrically in relation to the longitudinal axis of the radome forward of the antenna in the radome in the direction from which the signals are received, and are tilted forward toward the radome axis from the interior wall of the radome at such an angle as to provide a phase lag in frequency components of the received signal at the high end of the given frequency band and a phase lead in frequency components of the received signal at the low end of the given frequency band. Compensation is thereby provided for the boresight error that is caused by the phase shifts of the different frequency components of the received signal that result from the received signal passing through the wall of the radome.

2 Claims, 7 Drawing Figures

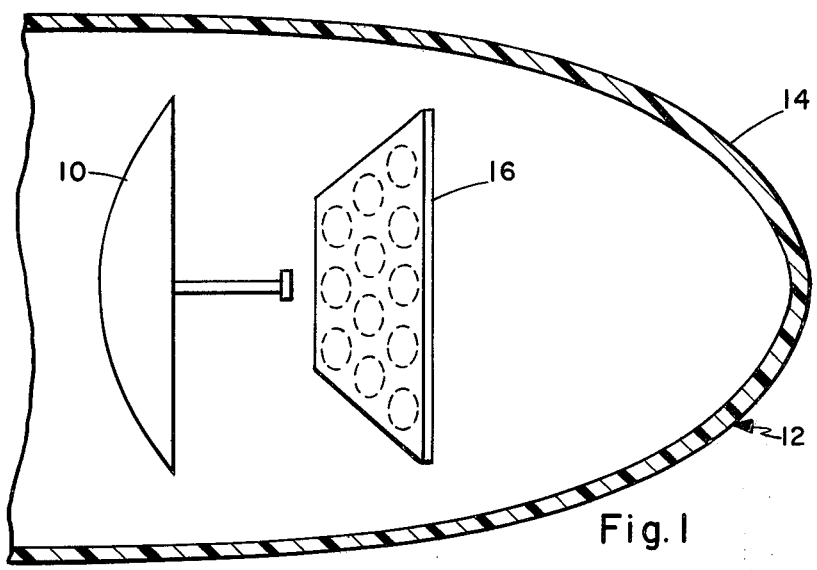
Fig. 1
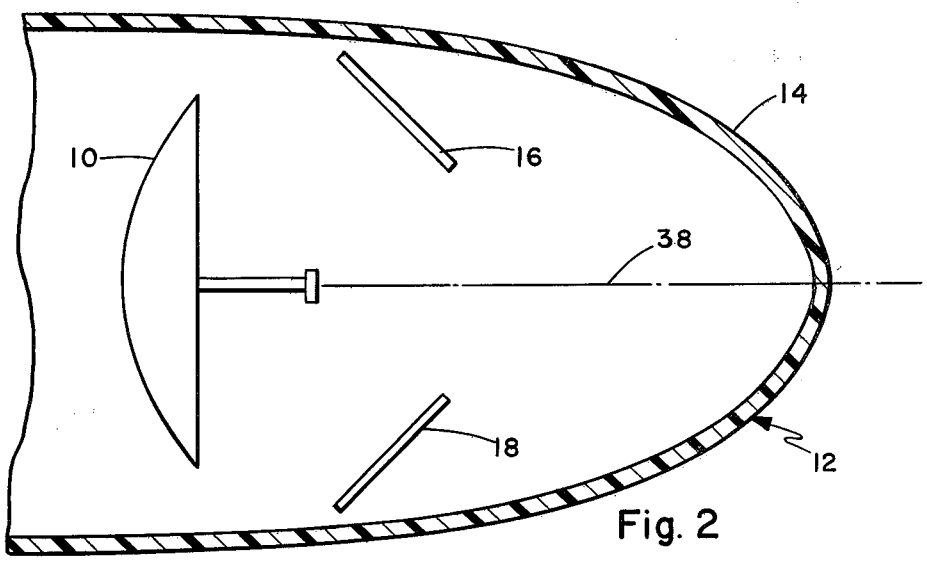
Fig. 2
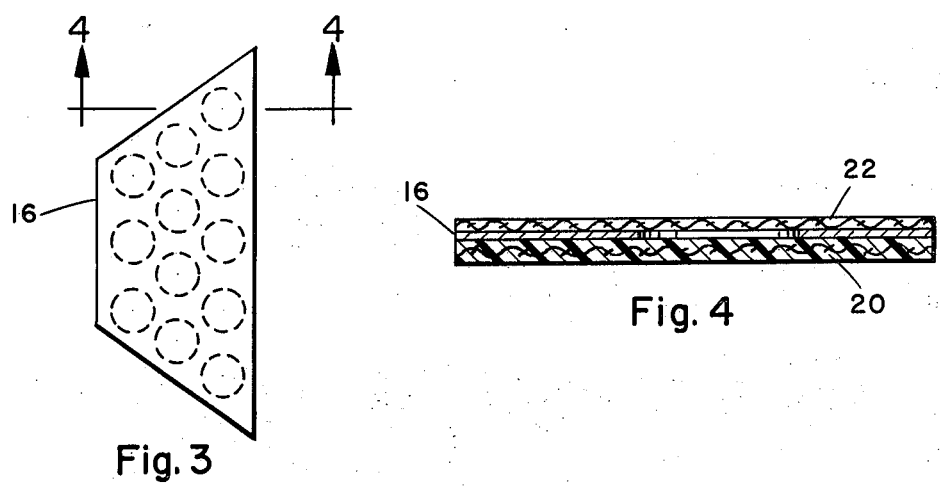
Fig. 3
Fig. 4

BORESIGHT ERROR COMPENSATION IN BORESIGHTING ANTENNA-RADOME SYSTEM

BACKGROUND OF THE INVENTION

The present invention generally pertains to antenna-radome systems and is particularly directed to compensation for boresight error in a bore-sighting antenna-radome system.

A radome is a protective covering for an antenna. Radomes typically are used for covering radar antennas in missiles and aircraft so as to protect the antennas from the effects of the extreme environments in which they are used. However, the radome wall includes dielectric material and as a result, the signal that is received by an antenna covered by a radome is affected by its passage through the wall of the radome to the antenna.

In a boresighting antenna-radome system for receiving signals within a given frequency band, the different frequency components of the received signal are shifted in phase by their passage through the radome wall and the phase front is tilted. This results in the received signal providing an apparent angular displacement from the true position of the target from which the signal is received. This apparent angular displacement is referred to as the boresight error.

One system for reducing the boresight error in a boresighting antenna-radome system is described in U.S. Pat. No. 3,063,654 to Youngren et al. In such system a hollow dielectric member is carried on the inner periphery of the radome and is positioned within the nose portion thereof immediate the fore end of the radome and the scanning disk of the antenna. Although such system does provide reduction of the boresight error, at one specific frequency in the received signal, by causing a phase lag at that specific frequency, it also introduces an undesired phase lag at other frequencies that are displaced from the specific frequency within the frequency band of the received signal. This effect is due to the capacitive nature of the dielectric material in the hollow member that is positioned in the nose portion of the radome.

SUMMARY OF THE INVENTION

The present invention provides for compensation of the boresight error in a boresighting antenna-radome system. According to the present invention, a boresighting antenna-radome system, including a boresighting antenna for receiving signals within a given frequency band, and a radome having a longitudinal axis of symmetry and covering the antenna and the space forward of the antenna in the direction from which the signals are received, is characterized by one or more pairs of perforated metal plates, each plate having a dielectric material thereon, wherein the plates of each pair are positioned symmetrically in relation to the radome axis, forward of the antenna in the radome and are tilted forward toward the radome axis from the interior wall of the radome at such an angle as to provide for phase lag in frequency components of the received signal at the high end of the given frequency band and phase lead in frequency components of the received signal at the low end of the given frequency band.

Compensation is thereby provided for the boresight error that is caused by the phase shifts of the different frequency components of the received signal that result from the received signal passing through the dielectric wall of the radome. Such compensation is provided without degrading other characteristics of the system, such as radome attenuation and antenna sidelobes.

The perforated metal plate with a dielectric material thereon is in effect an inductive element which provides a frequency sensitive characteristic which is inverse to the capacitive characteristic of the dielectric material used in the radome wall. The amount of dielectric material on the metallic plate determines the extent of the inductive effect provided by the plate, with the plate being made less inductive as more dielectric material is added.

The dielectric material may be on either or both sides of the plate or within the apertures of the plate.

Preferably the perforations in the plate are circular apertures that are arranged in a symmetrical lattice, whereby the perforation shape and arrangement are independent of the polarization of the received signal. The size of the circular apertures and the spacing between the apertures are functions of frequency, however, and are adjusted in accordance with the frequency of the signal that the antenna is adapted to receive.

In a preferred embodiment, wherein the antenna is adapted for receiving a signal that is polarized along a given axis, a pair of the perforated flat metal plates is positioned along the given axis on opposite interior sides of the radome.

BRIEF DESCRIPTION OF THE DRAWING

FIG. 1 is a schematic illustration of the boresighting antenna radome system of the present invention showing a skewed view of one of the perforated metal plates as positioned in the radome.

FIG. 2 is a schematic illustration of the boresighting antenna radome system showing side views of the perforated metal plates, as positioned in the radome. The view shown in FIG. 2 is rotated 90° about the longitudinal axis of the radome from the view shown in FIG. 1.

FIG. 3 is a front plan view of the perforated metal plate.

FIG. 4 is an enlarged partial sectional side view of the perforated metal plate having dielectric material thereon as seen along lines 4—4 in FIG. 3.

DESCRIPTION OF THE PREFERRED EMBODIMENT

Figure 5:
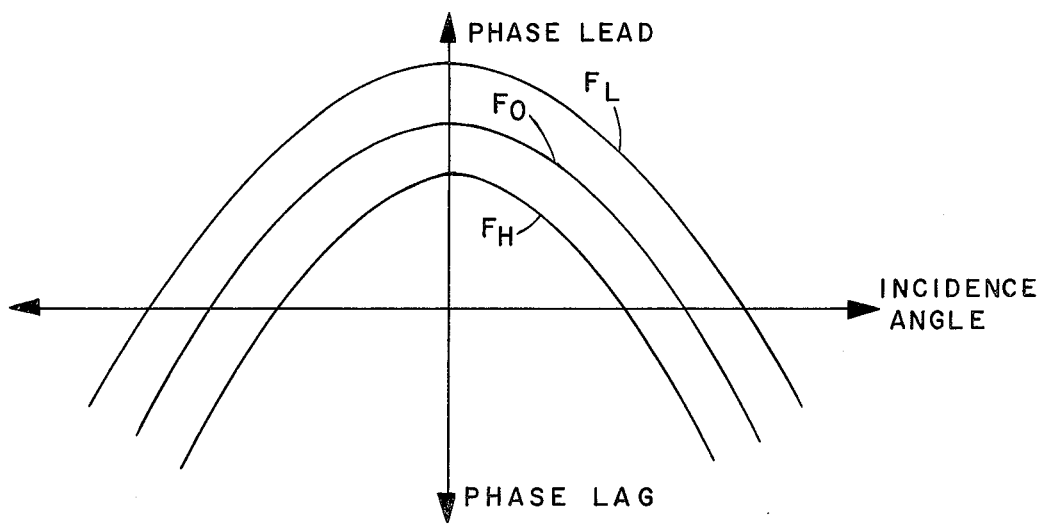
FIG. 5 shows a family of curves that are plotted for determining the angle at which the perforated metal plate is tilted forward in the radome to provide the desired compensation of boresight error.

Referring to FIGS. 1 and 2 a boresighting antenna 10 is positioned in a radome 12. The radome 12 covers the antenna 10 and the space forward of the antenna 10 in the direction from which signal are received. The radome has a longitudinal axis of symmetry 38.

The wall 14 of the radome 12 includes a dielectric material.

A pair of perforated flat metal plates 16 and 18 are positioned forward of the antenna 10 within the radome 12.

Referring to FIG. 4, the perforated metal plate is a thin aluminum plate 16 on rigid dielectric material laminate 20. Other metals may be used instead of aluminum. The rigid laminate 20 is a fiber glass laminate of epoxy resin and fiber glass cloth. The relative dielectric constant of the dielectric material 20 is about 4.3. The other side of the perforated metal plate 16 is covered by one or more laminations of a fiber glass pressure sensitive adhesive tape 22. The tape 22 has a relative dielectric constant of about 3.2. Other dielectric materials are also satisfactory. The number of layers of tape 22 depends upon the extend of inductive effect that is desired for the perforated metal plate-dielectric material combination. As more layers are applied the inductive effect is diminished.

The metal plates 16 and 18 are positioned symmetrically in relation to the radome axis 38 on the radome wall 14 on opposite sides the radome. When the antenna 10 is adapted for receiving a signal that is polarized along a given axis, the pair of plates 16 and 18 are positioned on the given axis.

The plates 16 and 18 are tilted forward toward the radome axis 38 from the interior of the radome wall 14. The angle at which the plates are tilted is determined by the following procedure.

Figure 6:
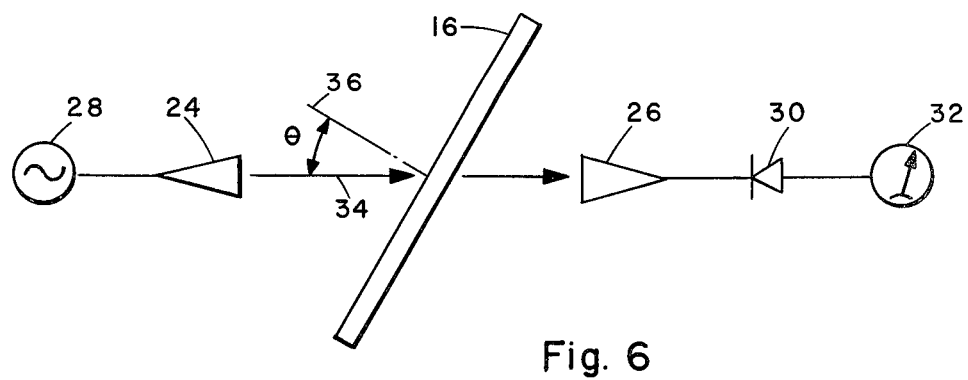
FIG. 6 is a schematic illustration of a system which is employed for obtaining the family of curves shown in FIG. 5.

Families of curves showing phase shift versus incidence angle are plotted at the high, low, and center frequencies of the given frequency band of the received signal for perforated metal plates having different amounts of dielectric material in the laminations that are on the plates. One such family of curves is shown in FIG. 5. The incidence angle is the angle between an axis normal to the plate and the axis along which the received signal is received. In order to obtain these curves a system such as is shown in FIG. 6 is employed. The plate 16 is positioned between a transmitting antenna 24 and a receiving antenna 26. A signal generator 28 provides a signal at a selected frequency to the transmitting antenna 24. The signal received by the receiving antenna 26 is detected by a detector 30 and an indication of the signal is provided by an indicating device 32.

The plate 16 can be rotatably positioned at different incidence angles $\theta$. The incidence angle $\theta$ is the angle between the axis 34, along which the signal is received by the antenna 26 from the antenna 24, and an axis 36 normal to the plate 16.

The curve $F_L$ in FIG. 5 represents the phase shift caused by the plate 16 in frequency components at the low end of the given frequency band of the received signal. To obtain the plot of the curve $F_L$ a signal is transmitted at the frequency $F_L$ by the antenna 24, in the system of FIG. 6 with the plate 16 removed from the system. A signal is then transmitted at the same frequency with the plate 16 positioned at a given incidence angle $\theta$ to determine the degree of phase shift caused by the plate 16 when it is at the given incidence angle. The incidence angle $\theta$ is continuously varied so as to provide a continuously plotted phase shift curve from the indicating device 32.

The curves $F_H$ and $F_o$ represent the phase shift caused by the plate 16 in frequency components at the high end of the given frequency band and at the center frequency of the given band respectively. The curves $F_H$ and $F_o$ are plotted in the same manner as the curve $F_L$. The family of curves can be shifted upward or downward by adjusting the amount of dielectric material 22 on the plate 16. As more dielectric material 22 is added to the plate 16, the family of curves shifts downward thereby indicating that the effect of the plate 16 is to provide more of a phase lag.

It is desired to obtain a family of curves wherein at the particular incidence angle where there is zero phase lead and zero phase lag at the center frequency $F_o$, the amount of phase lead in the low frequency component $F_L$ equals the amount of phase lag in the high frequency components $F_H$. Such a family of curves is obtained by adjusting the amount of dielectric material 22 on the plate 16. When such a family of curves is obtained, the incidence angle at which there is no phase lead or phase lag at the center frequency $F_o$ is ascertained, and such incidence angle is the angle at which the plates 16 and 18 are tilted forward in the radome 12 with respect the longitudinal axis of the radome 38. (FIG. 2)

Figure 7:
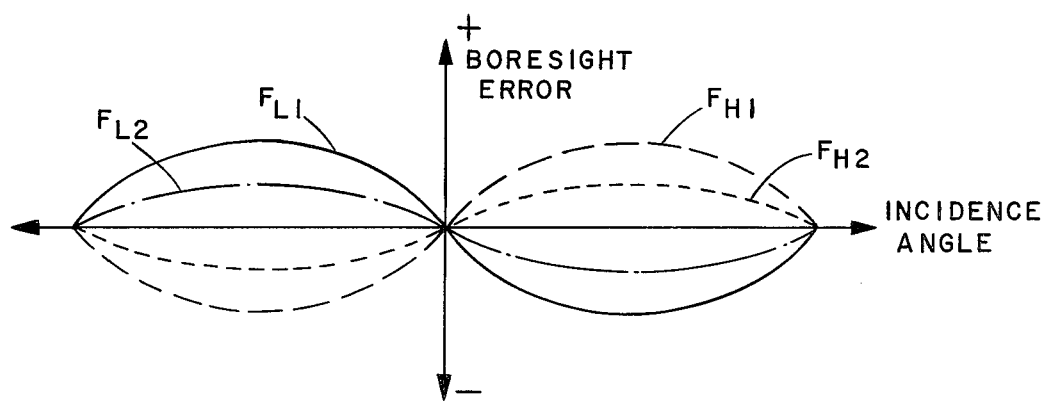
FIG. 7 shows relative plots of boresight error as present in a boresighting antenna-radome system constructed in accordance with the present invention, and a system constructed without the perforated metal plate of the present invention.

The degree of compensation provided by the plates 16 and 18 is shown in FIG. 7 which is a plot of boresight error. The curves $F_{L1}$ and $F_{H1}$ represent the boresight error in the boresighting antenna-radome system without the plates 16 and 18 being present; and the curves $F_{L2}$ and $F_{H2}$ represent the amount of boresight error with the plates 16 and 18 present in the system. The magnitude and slope of the boresight error is seen to be reduced by about half by the system of the present invention.

The size of the circular apertures in the plates 16 and 18 and the center to center spacing between the circular apertures are functions of the frequency of the received signal. The higher the frequency, the smaller the aperture diameter and the center to center spacing must be. A first approximation of the diameter and spacing are determined in accordance with the teaching in a publication by C. Chen, "Diffraction of Electromagnetic Waves by a Conducting Screen Perforated Periodically with Circular Holes", IEEE Transactions on Microwave Theory and Techniques, Vol MTT-19, No. 5, May 1971, pp 475–481, the disclosure of which is incorporated herein by reference thereto.

Although the plate 16 containing the symmetrical lattice of circular apertures illustrated in FIG. 3 has a symmetrical trapizoidal shape, other shapes may be appropriate for given boresighting antenna-radome systems. The plate is shaped in accordance with the shape and illumination function of the antenna and the shape of the radome.

If at the particular incidence angle wherein the desirable phase lead and lag balance is obtained as indicated by analysis of the family of curves $F_L$, $F_o$, $F_H$ (FIG.5) the attenuation provided by the plate 16 is unacceptably high, the lattice structure must be adjusted, such as by varying the spacing between the apertures. Then a new family of curves $F_L$, $F_o$, $F_H$ must be plotted and analysized in order to determine the desired incidence angle.

I claim:

1. A boresighting antenna-radome system, comprising:

a boresighting antenna for receiving signals within a given frequency band; and a radome covering the antenna and the space forward of the antenna in the direction from which said signals are received, wherein the radome has a longitudinal axis and symmetry and a wall which includes dielectric material and thereby causes phase shifts in the received signal passing through the radome wall;

wherein the improvement comprises:

one or more pairs of perforated metal plates, each plate having a dielectric thereon, the plates of each pair being positioned symmetrically in relation to the radome axis, forward of the antenna in the radome, and tilted forward toward the radome axis from the interior wall of the radome such that the forward-most edge of each plate is nearest the axis of the radome at such an angle as to provide a phase lag in frequency components of the received signal at the high end of the given frequency band and a phase lead in frequency components of the received signal at the low end of the given frequency band, so as to compensate for the phase shifts caused by passage of the received signal through the radome wall.

2. A boresighting antenna radome system according to claim 1, wherein the perforations in the plates are circular apertures arranged in a symmetrical lattice.

* * * * *

UNITED STATES PATENT AND TRADEMARK OFFICE
CERTIFICATE OF CORRECTION

PATENT NO. : 4,091,388
DATED : May 23, 1978
INVENTOR(S) : Thomas Edward Fiscus

It is certified that error appears in the above-identified patent and that said Letters Patent are hereby corrected as shown below:

In Claim 1 at Column 4, line 62, "and" (first occurrence) should read --of--.

Signed and Sealed this

Third Day of October 1978

[SEAL]

Attest:

RUTH C. MASON
*Attesting Officer*

DONALD W. BANNER
*Commissioner of Patents and Trademarks*